No. 812,329. PATENTED FEB. 13, 1906.
W. G. DAUGHERTY.
APPARATUS FOR APPLYING MOLTEN SOLDER TO SHEET METAL, CAN CAPS, &c.
APPLICATION FILED OCT. 18, 1905.
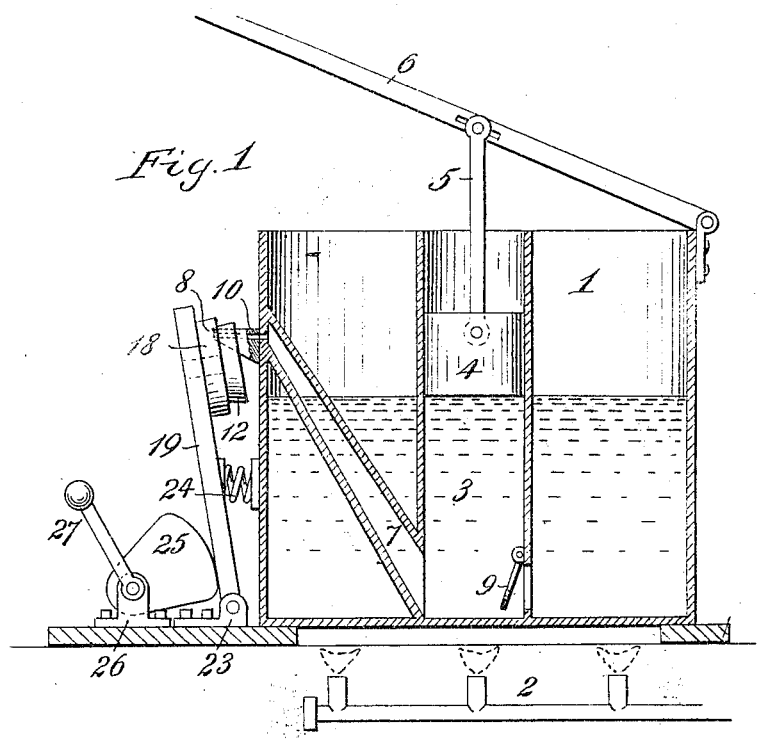
Fig. 1
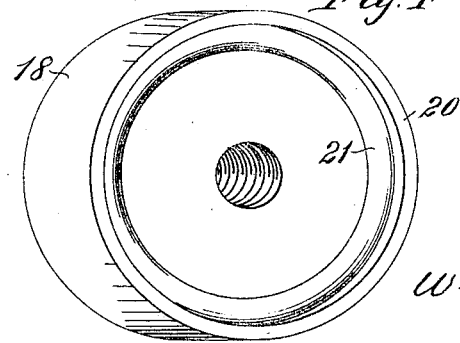
Fig. 2
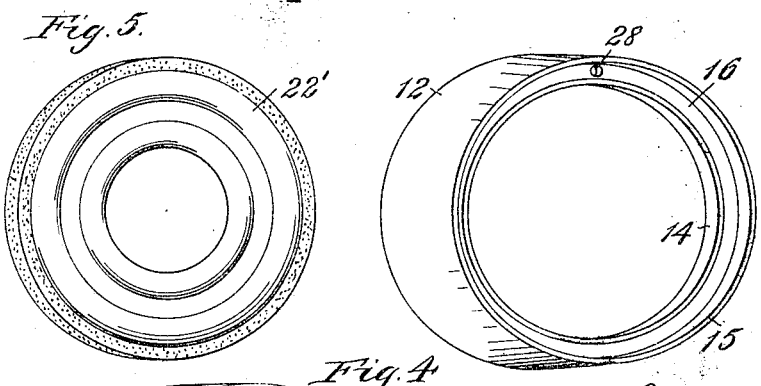
Fig. 5
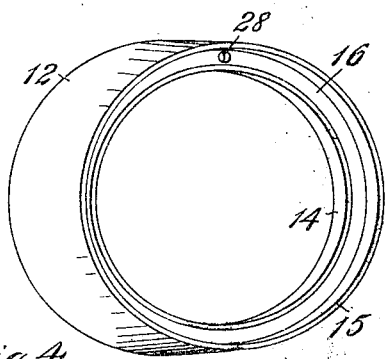
Fig. 4
Fig. 3
Witnesses
Geo. B. Pitts.
E. R. Ratcliffe
Inventor
Wm. G. Daugherty,
By H. N. Low
Attorney ic
UNITED STATES PATENT OFFICE.

WILLIAM G. DAUGHERTY, OF BALTIMORE, MARYLAND.

APPARATUS FOR APPLYING MOLTEN SOLDER TO SHEET METAL CAN-CAPS, &c.

No. 812,329.

Specification of Letters Patent.

Patented Feb. 13, 1906.

Application filed October 18, 1905. Serial No. 283,253.

*To all whom it may concern:*

Be it known that I, WILLIAM G. DAUGHERTY, a citizen of the United States, residing at the city of Baltimore, in the State of Maryland, have invented certain new and useful Improvements in Apparatus for Applying Molten Solder to Sheet Metal, Can-Caps, &c., of which the following is a specification.

My invention has for its object to apply solder in a molten state to can-caps, can-bodies, or other articles, so that it will remain thereon in the form of a film, bead, or hem ready for a subsequent soldering process by which the cap is united with a can-body or the edges of the can-body joined together.

The invention consists in the parts and combinations thereof hereinafter described and claimed.

In carrying the invention into practical effect I employ a known form of pump for forcing solder, which is by suitable heating apparatus kept in a molten state, into contact with the can-cap or other article on such limited portion of the surface of the article as is suitable for the subsequent soldering process. With such a forcing apparatus for the molten solder I combine a holding means for the can-cap or other article so shaped as to exclude the molten solder from such portions of the surface of the article as it is desired to keep free from solder, but to expose that portion of the surface to which the solder is to be applied. A suitable holding means for this purpose I have found to be a pair of dies which are interiorly shaped to conform closely to the can-cap or other article and to fit tightly against the surface of the same in such manner as to admit the melted solder to the part which is to be coated and to exclude the solder from all other parts of the surface of the article. In the holding device or pair of dies, which I hereinafter use as a means of illustrating and describing my invention, said dies are of circular form, and that die which is at the convex side of the cap is formed with an annular solder-receiving space around the extreme edge of the can-cap and at the outer side and at the inner side of such annular space the die is shaped to fit closely against the opposing die and against the convex face of the cap. This space is left of sufficient area for the free flowing and application of the molten solder and is connected with the solder-forcing apparatus or pump by a duct through which the molten solder may flow when forced by the action of the pump.

In order to make the invention more clearly understood, I have shown in the accompanying drawings means for carrying the same into practical effect without limiting my improvements in their useful applications to the precise construction of apparatus which for the sake of illustration I have delineated.

In said drawings, Figure 1 is a vertical sectional view of a machine or apparatus for applying solder metal to sheet metal according to my invention, the said machine being specially adapted for such application of solder to can-caps. Fig. 2 is a sectional view, on a larger scale, of the dies between which the caps are held during the process, showing also a cap held in place between the dies and a film or bead of solder which has been applied to the cap. Fig. 3 is a perspective view of what I term the "inner" die. Fig. 4 is a similar view of the outer die. Fig. 5 is a perspective view of a can-cap having a film or bead of solder thereon.

The apparatus illustrated is specially designed as to the shape of the holding device or dies for the application of solder to can-caps, and in the above-described drawings the solder-receiving space between the dies is somewhat exaggerated in size for the sake of clearness of illustration.

It will be understood that the apparatus will or can be suitably modified, especially as to the shape of the metal-holding means or dies, when the process is to be carried out with can-bodies or other articles.

Referring to the drawings, 1 is a receptacle for molten solder, in which the latter is kept fluid by a heating means 2, here shown as consisting of gas-burners.

3 is a cylinder or pressure chamber within the receptacle, in which fluid solder is received through a check-valve 9 and where pressure is applied to the same by a piston 4, actuated by a rod 5 and lever 6. The operation of the valve 9 is such that the solder which flows freely through it when the piston is raised is prevented from flowing back when the piston is depressed and is consequently forced through a duct 7 and tube 10 to an outlet or nozzle 8, where it is applied to the can-cap or other article.

12 is the inner die, having a recess 11, in which the tube 10 fits closely when the two dies are carried toward and against the tube.

18 is the outer die, on or within which the inner die removably fits and which is attached to an arm 19, pivoted to a bracket or lug 23.

24 is a spring applied so as to tend to hold the dies away from the tube 10.

25 is a lever which is weighted or otherwise constructed to press the arm 19 and the dies and their contained cap against the tube 10.

27 is a lever or handle for the actuation of the arm 19, the said lever 25 being pivotally mounted on a bracket or lug 26. By depressing the handle 27 the lever 25 is caused to release the arm 19, whereupon the spring 24 will press the arm outward and carry the dies to a sufficient distance from the tube 10 to allow the inner die to be removed and a cap to be inserted between the dies or removed therefrom. The opposing faces of the said inner and outer dies are properly shaped, according to the contour of the cap or other article to be operated upon, to fit such article and leave a space in which solder is confined and applied to the article. In the construction illustrated I have shown a cap formed with a bead 22' at or near its periphery, which bead is fitted by a corresponding bead 21 on the inner surface of the outer die. The outer die also has a peripheral flange 20, within which fits the can-cap, and also a somewhat similar flange 15 of the inner die. At a distance within the flange 15 is arranged a similar flange or ring 14, formed on the outer face of the inner die, so as to leave between the flanges 14 and 15 a space 16. With this space communicates the outlet 8 through an orifice 28. The flange 14 is of such height as to meet and fit firmly upon the inner face of the cap, as indicated in Fig. 2, in which it is shown as bearing upon the bead 22'. By the parts described above the space 16 is entirely inclosed except where it is entered by the orifice 28, so that the solder forced through said orifice by appliances already described is confined within the space 16 and forced into contact with the inner face of the cap along and around an annular space thereon, where it adheres and cools to a solid state. On can-caps the solder may thus be applied along an annular portion of the face of the cap, or it may be applied upon a peripheral flange around the cap, or on both of such surfaces, as indicated in Fig. 5. As soon as the solder has been forced by the piston 4 into the space 16 the pressure of the piston is removed by raising the handle 6, and when the solder has set in a solid state in a film or bead around the surface of the cap the handle 27 is depressed to allow the retraction of the dies and the removal of the inner die, and the finished cap is removed from the outer die to be replaced by another cap for the repetition of the process.

While I have shown and described the holding means for the cap or other article as a mold or receptacle consisting of two parts or dies, the invention is not limited to forming such receptacle of two parts only, nor is the invention limited to the particular manner of moving or manipulating the receptacle relative to the solder-forcing means.

What I claim is—

1. In an apparatus for applying molten solder to sheet metal, can-caps and other articles, the combination of a holding means for the article having an inclosed space next to the surface of the article, which space limits the extent of the surface of the article which receives the molten solder, and means for forcing molten solder into said space and against the said surface of the article, substantially as and for the purposes described.

2. In an apparatus for applying molten solder, the combination of separable dies between which the can-cap or other article is held, one of said dies having a space which is inclosed by the die and by the solder-receiving surface of the article, and means for forcing molten solder into said space and against said surface of the article, substantially as and for the purposes described.

3. In combination with a mold or receptacle for holding the can-cap or similar article with only that portion of the article exposed where the solder is to be applied, means for forcing solder into said receptacle, substantially as set forth.

4. In an apparatus for applying molten solder, the combination of a mold or receptacle for holding the can-cap or other article with only that portion of the article exposed where the solder is to be applied, a device for forcing solder into said receptacle, and means for bringing together and for separating the said receptacle and the solder-forcing device, substantially as set forth.

In testimony whereof I affix my signature in presence of two witnesses.

WILLIAM G. DAUGHERTY.

Witnesses:
H. N. Low,
J. Alex. Hilleary, Jr.